US008228346B1

(12) United States Patent
Pan et al.

(10) Patent No.: US 8,228,346 B1
(45) Date of Patent: Jul. 24, 2012

(54) SYSTEMS AND METHODS FOR DISPLAYING FIXED-SCALE CONTENT ON MOBILE DEVICES

(75) Inventors: Wayne Pan, San Jose, CA (US); Omar Hamoui, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/244,879

(22) Filed: Sep. 26, 2011

Related U.S. Application Data

(63) Continuation of application No. 13/069,325, filed on Mar. 22, 2011.

(60) Provisional application No. 61/340,726, filed on Mar. 22, 2010.

(51) Int. Cl.
*G09G 5/00* (2006.01)
*G06F 3/00* (2006.01)
*G06F 3/048* (2006.01)

(52) U.S. Cl. ........ 345/660; 715/760; 715/800; 715/801; 705/14.4

(58) Field of Classification Search ..................... None
See application file for complete search history.

(56) References Cited

U.S. PATENT DOCUMENTS

| 7,346,545 | B2 | 3/2008 | Jones | |
|---|---|---|---|---|
| 7,880,752 | B2 * | 2/2011 | Torimoto et al. | 345/667 |
| 2009/0263026 | A1 * | 10/2009 | Verne et al. | 382/209 |
| 2010/0057558 | A1 * | 3/2010 | Yano | 705/14.45 |
| 2011/0035274 | A1 * | 2/2011 | Goel et al. | 705/14.45 |
| 2011/0119586 | A1 * | 5/2011 | Blinnikka et al. | 715/719 |
| 2011/0231265 | A1 * | 9/2011 | Brown et al. | 705/14.73 |

* cited by examiner

*Primary Examiner* — Daniel Washburn
*Assistant Examiner* — Donna Ricks
(74) *Attorney, Agent, or Firm* — Birch, Stewart, Kolasch & Birch, LLP

(57) ABSTRACT

A system and method for maintaining certain content items at a fixed size and resolution and/or position relative to a device display are described herein. Fixed-scale content items are maintained at a given size, resolution, and/or, in some cases, position relative to a display regardless of changes in size and/or resolution of other displayed content.

12 Claims, 7 Drawing Sheets

SYSTEMS AND METHODS FOR DISPLAYING FIXED-SCALE CONTENT ON MOBILE DEVICES

This application is a continuation of co-pending application Ser. No. 13/069,325, filed on Mar. 22, 2011, for which priority is claimed under 35 U.S.C. §120, which claims the benefit of priority to Provisional Application No. 61/340,726, filed on Mar. 22, 2010, the entire contents of which are hereby incorporated by reference in their entireties.

FIELD

The present invention generally relates to systems and methods for resizing online content displayed on mobile devices.

PRIORITY

The present Application claims benefit of priority to Provisional Application 61/340,726, filed on Mar. 22, 2010 in the United States Patent and Trademark Office, the entire contents of which are hereby incorporated by reference.

BACKGROUND

In the realm of mobile computing devices, devices with limited screen space pose a dilemma for content providers. In some cases, content providers such as advertisers, media delivery services, or notification services may wish to display a message or image or multimedia content in some portion of a screen on a device and have that content optimally sized for legibility and access on that device's display screen. If the display of that device is then subjected to a zoom-in, zoom-out, or other screen resolution change action, the position and legibility of the delivered content may be compromised. This may occur in a number of ways, including zooming or shrinking the content to a point where it is difficult to read, and causing the content to be moved partially or fully out of the display as a result of a zoom action.

SUMMARY

In view of the foregoing problem, it would be an advance in the state of the art to provide systems and methods for delivering and managing fixed-scale content items that do not change size, shape, and/or position relative to the display screen of a mobile device despite a re-sizing action that enlarges, reduces, or otherwise changes the size and shape of other content displayed thereon concurrently with the fixed-scale items.

One variation of the concepts discussed herein pertains to a method of maintaining a content item at a fixed size and resolution relative to a mobile device display in response to a display resolution change on the display that alters the size of other content in the display.

In some variations, such a method may include steps of detecting the display resolution change with a display resolution detector on the mobile device; determining an amount of the resolution change; calculating an adjustment ratio based on the determined amount of resolution change; applying the adjustment ratio to the size and resolution of the content item such that its size and resolution change with respect to the other content in the display but remain fixed relative to the mobile device display; and enabling presentation of the adjusted content item on the mobile device along with the other content.

In further variations, the step of detecting the display resolution change may include detecting the start of a display resolution change; determining a starting size and resolution of content displayed at the start of the display resolution change; detecting the end of a display resolution change; and determining an intended size and resolution of content displayed at the end of the display resolution change.

Also, in such variations, the adjustment ratio calculation may include calculating, as the amount of resolution change, the type and magnitude of resolution change based on a difference between the intended size and resolution and the starting size and resolution.

In yet further variations, the step of enabling presentation may include serving the adjusted content item to the mobile device with a content server. In some such variations, the content items may be an advertisement included as part of a web page to be delivered to a mobile device. In further such variations, adjustment ratio calculation and application may also occur at the content server.

In further variations, determining an amount of the resolution change may include determining a location shift amount associated with the content item. Also, in such variations, applying the adjustment ratio may include correcting a relative location of the content item with respect to changed display resolution such that the content item remains in a fixed location relative to the mobile device display.

In some variations, a resolution compensator on the mobile device carries out the steps of determining, calculating, applying, and enabling. In further such variations, the display resolution detector and the resolution compensator are included in the content item. In yet further such variations, the content item is initially delivered to the mobile device by a content server via a communication network.

Yet a further variation may pertain to a method of maintaining the display size of a content item, included with other content displayed on a display screen of a mobile device and delivered at an initial display size, in response to a display size change event on the device that alters the displayed size the other content. Such a method variation may include steps of detecting the display size change event; determining an intended display size of the content item responsive to the display size change event; determining, as an amount of display change, a type and magnitude of display size change based on a difference between the intended display size and the initial display size; and an intended location shift amount of the content item responsive to the display size change event; calculating an inverse adjustment ratio based on the determined type and magnitude of display size change; applying the inverse adjustment ratio to the size of the content item such that its displayed size remains fixed with respect to the size of the display screen of the mobile device; calculating a location recovery shift based on the location shift amount; applying the location recovery shift to the intended location shift amount of the content item such that the content item remains in a fixed location relative to an initial display location on the mobile device display screen; and enabling presentation of the adjusted content item on the mobile device along with the other content.

Further variations of the concepts discussed herein may pertain to a tangible computer-readable medium having embodied thereon a program which, when executed by a computing device, causes the device to perform method of maintaining a content item at a fixed size and resolution relative to a mobile device display in response to a display resolution change on the display that alters the size of other content in the display. Such a method would be consistent with the steps and variations discussed above. In some such variations, the mobile device is the device executing the program.

Yet further variations of the concepts discussed herein may pertain to a system for maintaining a content item at a fixed size and resolution relative to a mobile device display in response to a display resolution change on the display that alters the size of other content in the display.

Variations of such a system may include modules and/or components that may be hardware, software, firmware, and/or a combination thereof. Such components may include an adjustment ratio calculator that accepts as inputs: a starting resolution, on the mobile device, of content that includes the content item; an ending resolution, on the mobile, device, of content that includes the content item; and an available resolution of the mobile device display. Variations of such an adjustment ratio calculator are configured to generate, as output, an adjustment ratio based on the available resolution and a difference between the starting resolution and the ending resolution.

Variations of such a system may also include an adjustment ratio application unit that applies an adjustment ratio to the content item such that its size and resolution changes with respect to the other content in the display but remains the same with respect to the device display; and an adjusted content item provision unit that provides the adjusted content item to the mobile device for display along with the other content.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description

BRIEF DESCRIPTION OF DRAWINGS

These and other objects, features and characteristics of the present invention will become more apparent to those skilled in the art from a study of the following detailed description in conjunction with the appended claims and drawings, all of which form a part of this specification. In the drawings:

Figure 1:
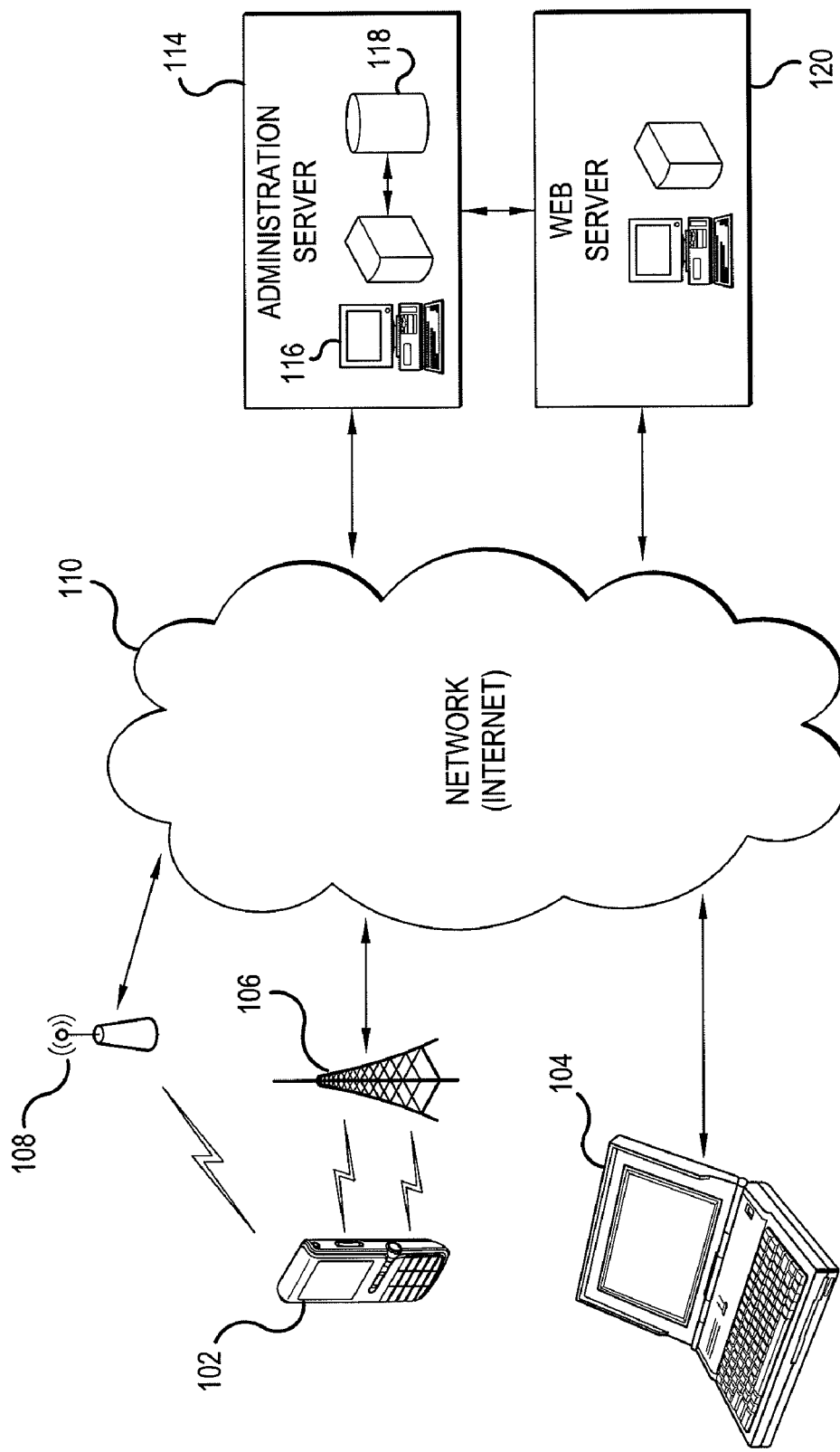
FIG. 1 provides a brief, general description of a representative environment in which the invention can be implemented.

The headings provided herein are for convenience only and do not necessarily affect the scope or meaning of the claimed invention.

In the drawings, the same reference numbers and any acronyms identify elements or acts with the same or similar structure or functionality for ease of understanding and convenience. The drawings will be described in detail in the course of the detailed description of the invention.

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below. The following detailed description does not limit the invention. Instead, the scope of the invention is defined by the appended claims and equivalents thereof.

FIG. 1 and the following discussion provide a brief, general description of a representative environment in which the invention can be implemented. Although not required, aspects of the invention may be described below in the general context of computer-executable instructions, such as routines executed by a general-purpose data processing device (e.g., a server computer or a personal computer). Those skilled in the relevant art will appreciate that the invention can be practiced with other communications, data processing, or computer system configurations, including: wireless devices, Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," and the like are used interchangeably herein, and may refer to any of the above devices and systems.

While aspects of the invention, such as certain functions, are described as being performed exclusively on a single device, the invention can also be practiced in distributed environments where functions or modules are shared among disparate processing devices. The disparate processing devices are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nano-technology memory, biological memory, or other data storage media. Alternatively, computer implemented instructions, data structures, screen displays, and other data related to the invention may be distributed over the Internet or over other networks (including wireless networks), on a propagated signal on a propagation medium (e.g., an electromagnetic wave(s), a sound wave, etc.) over a period of time. In some implementations, the data may be provided on any analog or digital network (packet switched, circuit switched, or other scheme).

As shown in FIG. 1, a user may use a personal computing device (e.g., a mobile device 102, a personal computer 104, etc.) to communicate with a network. The term "mobile device," as used herein, may be a cell phone, a personal digital assistant (PDA), a portable email device (e.g., a smart phone), a portable media player (e.g., an a media tablet and/or tablet computer), or any other device having communication capability to connect to the network. In one example, the mobile device 102 connects using one or more cellular transceivers or base station antennas 106 (in cellular implementations), access points, terminal adapters, routers or modems 108 (in IP-based telecommunications implementations), or combinations of the foregoing (in converged network embodiments).

In some instances, the network 110 is the Internet, allowing the mobile device 102 (with, for example, WiFi capability) or the personal computer 104 to access web content offered through various web servers. In some instances, especially where the mobile device 102 is used to access web content through the network 110 (e.g., when a 3G or an LTE service of the mobile device 102 is used to connect to the network 110), the network 110 may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), etc.

In some instances, a personal computing device (e.g., the mobile device 102, the personal computer 104, etc.) may connect to an administration server 114 through the network 110. In one embodiment, the administration server 114 comprises a server computer 116 coupled to a local database 118. The term "administration server" as indicated herein, refers to an individual or multiple server stations or other computing apparatus. In one embodiment, the administration server is a web server capable of hosting a website and storing content (e.g., various webpages) that is associated with the website. In some embodiments, the administration server is separate from a web server, but communicates with a web server to provide, manage, and/or control content generated by the web server. In general, the administration server 114 controls at least a portion of the content provided through or in connection with webpages (provided by, e.g., a website provider), to, for example, customize the content of the webpages based on previously identified preferences of users. In further variations, an administration server may be represented by an application or feature operating locally on the mobile device.

As will be explained in further detail herein, the administration server 114 incorporates one or more functional units to achieve each of the functionalities discussed herein.

As shown in FIG. 1, in some embodiments, the personal computing devices and the administration server 114 are connected through the network 110 to one or more web servers (e.g., web server 120). Each web server corresponds to a computing station that enables a website provider, for example, to provide web content (e.g., web pages) that can be accessed by the personal computing devices through the network 110.

As will be explained in further detail below, the administration server 114 operates in conjunction with a web server 120 to provide at least a portion of the content displayed on a screen of the mobile device 102. In embodiments, the administration server 114 provides an "advertising service" to provide advertisements in connection with websites displayed on mobile devices. The advertising service allows website providers to display advertisements through their websites, and controls the content of such advertisements.

In some instances, the advertising service places or operates advertising sections in the form of plug-in modules (e.g., software widgets, applets, etc.) within or in connection with the website, and displays advertisements within such plug-ins. As is known in the art, the advertising service, in some instances, may provide contextual advertising based on the content of the website.

When viewing the websites on a screen with smaller dimensions (for example, when viewing the websites on a handheld device, media tablet, netbook, or a mobile phone), there may be a tendency to adjust the display resolution of the screen (by, for example, zooming in or zooming out the display) for better viewing comfort. A problem with such adjustments is that the certain content-bearing sections of the website (such as advertising sections located at the top, bottom, and/or in corners of the website) are either moved away from the display or are otherwise rendered obscure or ineffective.

Figure 3A:
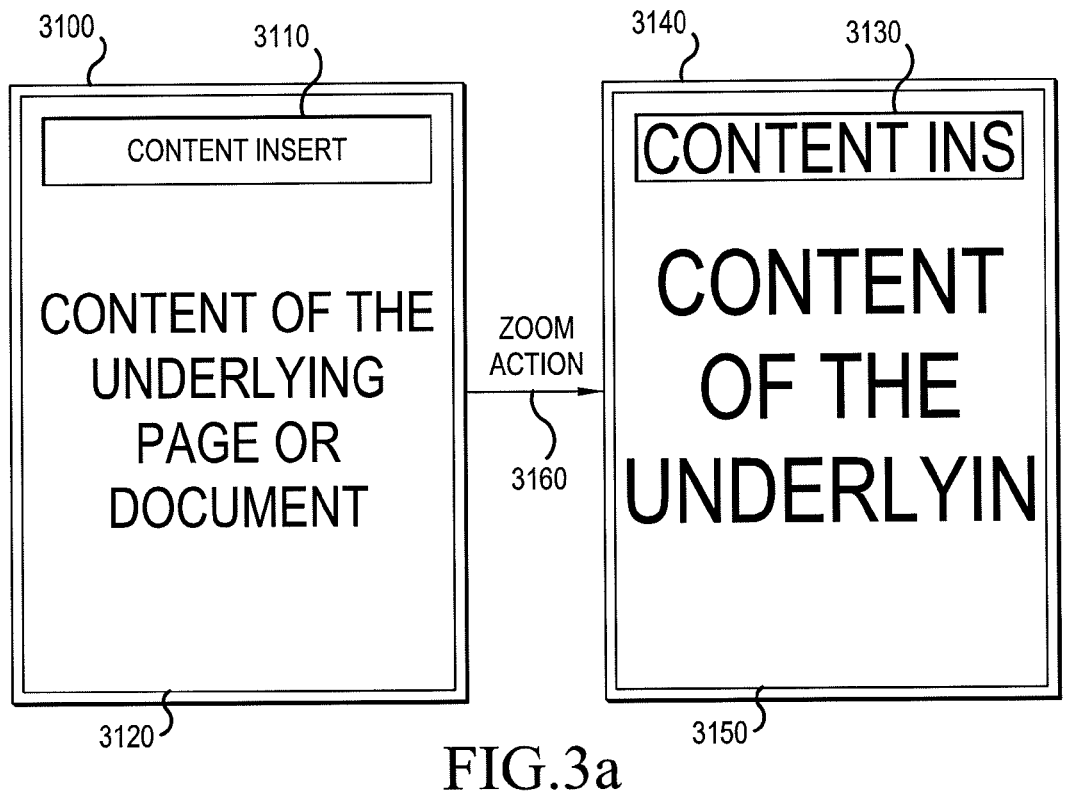
FIGS. 3A-3B depict the operation of a resizing action involving fixed-scale content item.

For example, as is illustrated in FIG. 3A, when the screen 3120 is zoomed in 3160 to magnify the text of the website or document 3120 displayed on the mobile device 102, 104, the corresponding content insert 3110 is also zoomed in along with the zoomed-in website or document 3150. Due to this magnification, the zoomed-in content insert 3130 is partially pushed away from the display of the screen 3140. The remaining content insert 3130 is ineffective in conveying the content to a viewer. In another example, when the screen is zoomed out to show the entire webpage within the screen of the mobile device 102, 104, the size of the advertising section is considerably reduced due to the zoom-out action. The reduced size, especially on a smaller display of a mobile device, may be ineffective in communicating the advertising content to a viewer.

Figure 3B:
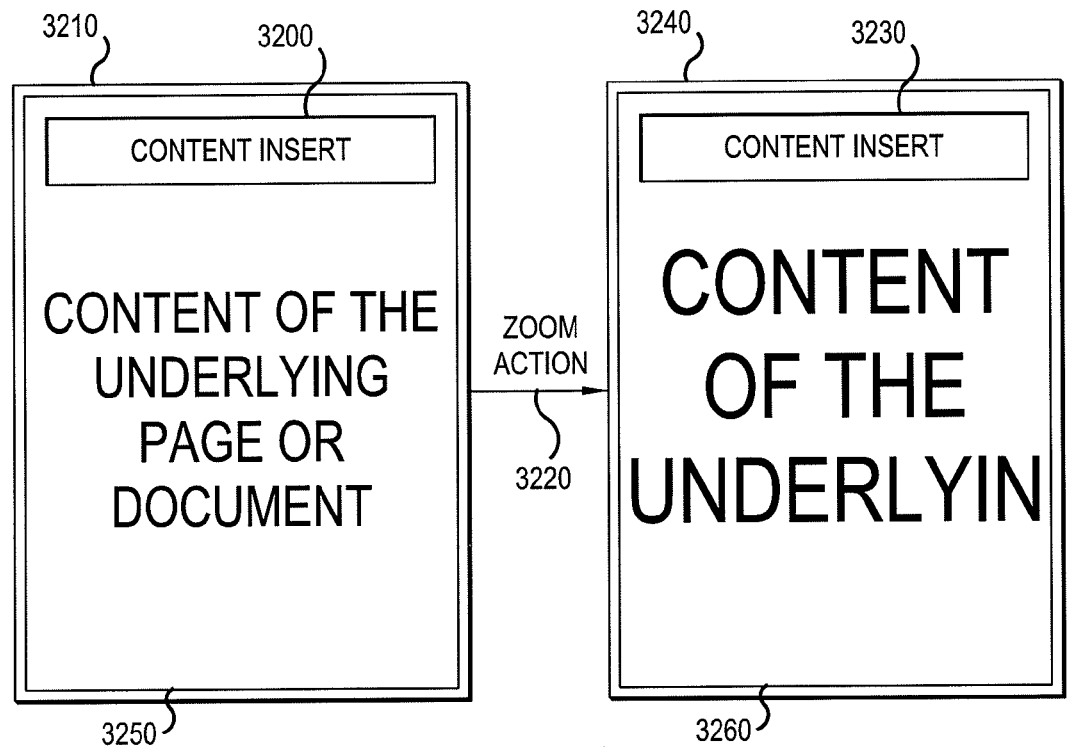

Accordingly, to compensate for such actions (i.e., actions that affect the display resolution of the screen), the content insert may be configured or otherwise served to the device such that the overall dimensions of the content insert change relative to its surrounding content and/or website whenever the display resolution of the screen is affected. Through the resizing action, the dimension change causes the overall size of the advertising section to remain fixed relative to the screen of the mobile device 102, 104 regardless of change in display resolution that may affect the size of the overall content, application, and/or website being displayed. An example of such an action is illustrated in FIG. 3B. When a display 3210 of a website or a document 3250 is zoomed in 3220, the magnified version of the website or document 3260 is displayed on the device screen 3240. However, as will be described in further detail below, the dimensions of the content insert 3200 are resized, such that the overall size of the content insert 3230 appears to remain constant before and after the zoom-in action 3220.

In some variations, the content insert 3200 may include a script or other executable code that measures a natural rendering width of the overall displayed content 3250 and compares it against the available rendering width on the device screen 3210. The ratio of the natural to available rendering widths may then be used as an initial zoom adjustment value for a fixed-scale content insert. As zoom-in 3220 and/or zoom-out events are detected on the device, the zoom adjustment value of the fixed-scale content insert 3230 may be further adjusted accordingly.

In variations that deal with applications and/or mobile apps, a content insert 3200 may itself contain such executable instructions or it may identify itself as a fixed-scale content insert and allow the application to perform the zoom adjustment for proper display. In variations that deal with web-based content, a web page 3250 and/or content insert 3200 may contain the necessary script elements to carry out the zoom adjustment locally on the device or a content administration server may adjust and re-deliver the content insert 3230 at the completion of a zoom-in or zoom-out event.

It is important to note that for purpose of further illustration, it is useful to consider the techniques explained herein as it applies to advertisements displayed on mobile devices. Of course, however, it should be noted that the techniques introduced here extend to other scenarios that do not involve advertisements and/or mobile devices. For example, the techniques described herein may be applied to any type of digital content (e.g., photographs, streaming media plug-ins, etc.), when the overall size of such digital content needs to be maintained at a fixed value relative to the dimensions of a corresponding display medium (e.g., screen of a laptop, screen of a mobile device, etc.).

Furthermore, although FIGS. 3A and 3B address a content banner displayed at the top of a web page, the techniques discussed are equally applicable regardless of content setting or the relative location of the content that is to be held at constant size relative to the display screen. In some instances, there may be multiple content inserts in an application, document, and/or web page that may be configured to remain at a constant size and location relative a display screen.

Furthermore, some variations may include fixed-scale content items delivered to a device browser at a particular size for the purpose of being legible and easily visible upon initial display on that device and/or browser. Such fixed-scale content items may have a specified size and/or location on the device browser and, during content re-sizing events (zoom in and/or zoom out) these fixed scale content items (in some cases perhaps more than one such item may be displayed in a browser/web page) are re-sized to remain at their initially delivered size and/or location. In such variations, size changes may not be limited only to detecting and determining resolution changes, but may also include scale alterations such as the application of a 100% zoom in or zoom out operation without regard for any resolution changes required to re-render the non-fixed-scale content. Such variations may also be implemented on variable-size browser and/or display windows where the fixed-scale content is not re-sized along with its underlying content during a window size change operation.

Such variations may also be implemented in conjunction with legibility thresholds based on a native resolution of the fixed-scale content item. Such a variation may allow for a limited variation in content item size based on upper and/or lower size thresholds for legibility of the displayed content item.

Figure 2:
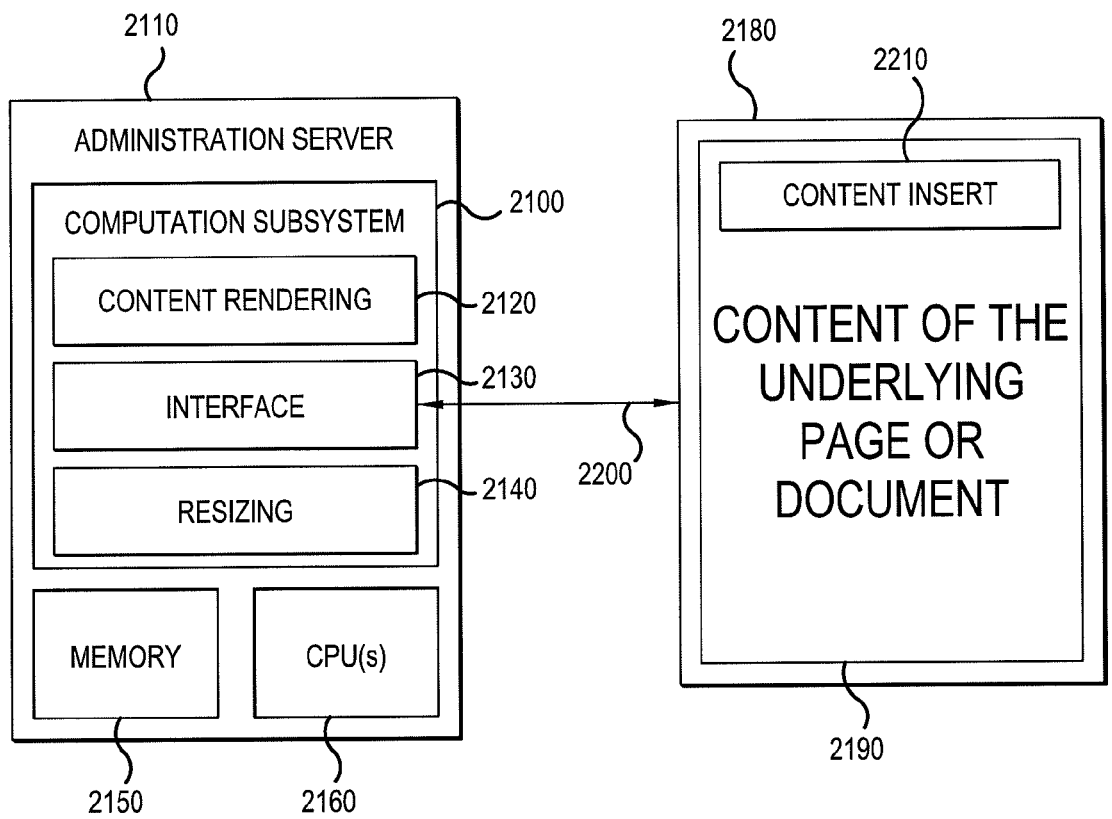
FIG. 2 is a block diagram illustrating an exemplary architecture of an administration server.

FIG. 2 is a block diagram illustrating an exemplary architecture of an administration server 2110 configured to perform the various functionalities described herein for variations that involve web pages or other online content delivery methods. In the illustrated embodiment, the administration server 2110 may be made up of one or more computer systems having one or more memories 2150 for storing data and one or more processors 2160 for processing the data stored in the memories 2150. In further variations, an administration server 2110 may be part of an overall computer system or may be an application or set of applications operating on a hardware platform having memory 2150 and processor(s) 2160 for a range of functions that include the administration server 2110. An administration server 2110 may include a computation subsystem 2100, which performs functionalities of the administration server 2110. Such a computation subsystem 2100 may be embodied in hardware, software, or a combination thereof. In some embodiments, the computation subsystem 2100 can be implemented by using programmable circuitry programmed by software and/or firmware, or by using special-purpose hardwired circuitry, or by using a combination of such embodiments. In some instances, the computation subsystem 2100 is implemented as a unit in a processor 2160 of the administration server 2110.

Embodiments of a computation subsystem 2100 may include a content rendering module 2120. In embodiments, the content rendering module 2120 is configured to render and present one or more content inserts 2210 (e.g., the advertising content) to be displayed in a given webpage or other document 2190. In some instances, the content rendering module 2100 communicates with the web server 120 to configure and present the advertising content The advertising content 2210 may be embedded in a given webpage 2190 that is displayed on, for example, the screen 2180 of a mobile device 102, 104. Variations of such on-screen display may be within a web browser, document viewer, or other content display applications or utilities. The advertising content 2210 may presented for display on the mobile device screen 2180 by the rendering module 2120 or by some other system or sub-system in the administration server 2110.

In embodiments, an interface module 2130 of the computation subsystem 2100 communicates 2200 with the web browser to detect any changes to display resolution of the screen 2180. This may be accomplished in some variations by inserting an event listener (e.g., a JavaScript) in the content insert 2210 (i.e. the advertising section in an ad-based variation) to establish a link 2200 between the interface module 2130 and a web browser other content display application/feature presenting content on the mobile device screen 2180. The interface module 2130 uses this link 2200 to detect any changes in display resolution of the screen 2180 of the mobile device 102, 104.

Variations configured to operate with applications and/or mobile apps or other local documents may not require a separate event listener as zoom-in and zoom-out events may be automatically detected and registered locally on the device 102, 104.

In some embodiments, the interface module 2130 communicates any changes in screen resolution to a resizing module 2140 of the computation subsystem 2100. Based on a type of change in display resolution, and a magnitude of such change, the resizing module 2140 computes a new set of dimensions for the content insert 2210. For example, when zoom-in occurs (effectively magnifying the display), the interface module 2130 captures a quantification of such a change (by, for example, capturing a change in pixel count for the displayed information), and reports this value to the resizing module 2140. The resizing module 2140 then calculates the dimensions that would be required for the advertising section 2210 to maintain a fixed size relative to the screen 2180 of the mobile device 102, 104. Subsequent to determining the new dimensions, the resizing module 2140 resizes the dimensions of the advertising section 2210 based on the calculated value. Accordingly, the size of the advertising section 2210 appears to be constant and fixed, regardless of changes to display resolution of the screen 2180 of the mobile device 102, 104.

Additionally, in some embodiments, a script (e.g., a JavaScript) embodying the resizing module 2140 is embedded within the markup language (e.g., the HTML code) that renders the given webpage 2190. This script dynamically reconfigures the dimensions of the advertising section 2210 and, in some cases, reloads the webpage after a change to the display resolution. Similarly, scripts embodying the computation subsystem 2100 or any one or more of its component modules (e.g., the content rendering module 2120, the interface module 2130, the resizing module 2140) may also be embedded within the markup language.

In some variations, the page, along with its associated content item(s), may be fully re-loaded from a server. In other variations, locally cached versions of the page and any associated content items may be adjusted and re-loaded. In yet further variations, some combination of locally cached and server-provided data may be re-loaded.

Additionally, in some embodiments, the interface module 2130 and the resizing module 2140 are configured to react to certain other events that change the display of the given webpage on the screen. For example, when scrolling through the screen horizontally or vertically (thus possibly moving the advertising section away from immediate display on the screen), the interface module 2130 detects and reports such actions to the resizing module 2140. In these embodiments, the resizing module 2140 repositions a location of the advertisement within the web browser, such that the location of the advertising section remains fixed relative to the screen. In some variations, scrolling events may be inherently included in zoom-in and/or zoom-out re-sizing events. A content insert 2210 located someplace other than at the focal point of a zoom operation, for instance, would automatically "scroll" in the zoom direction as the page/document 2190 was re-sized. In such variations, a fixed-scale content insert would not only be zoom adjusted for size, but also for position so that it keeps its intended location relative to the device display screen 2180.

Thus, through a combination of the features discussed herein, the computation subsystem 2100 ensures that the advertising section 2210 remains fixed both in location and in size (relative to the screen 2180) regardless of any user actions that may change the display of the given webpage 2190.

Figure 4:
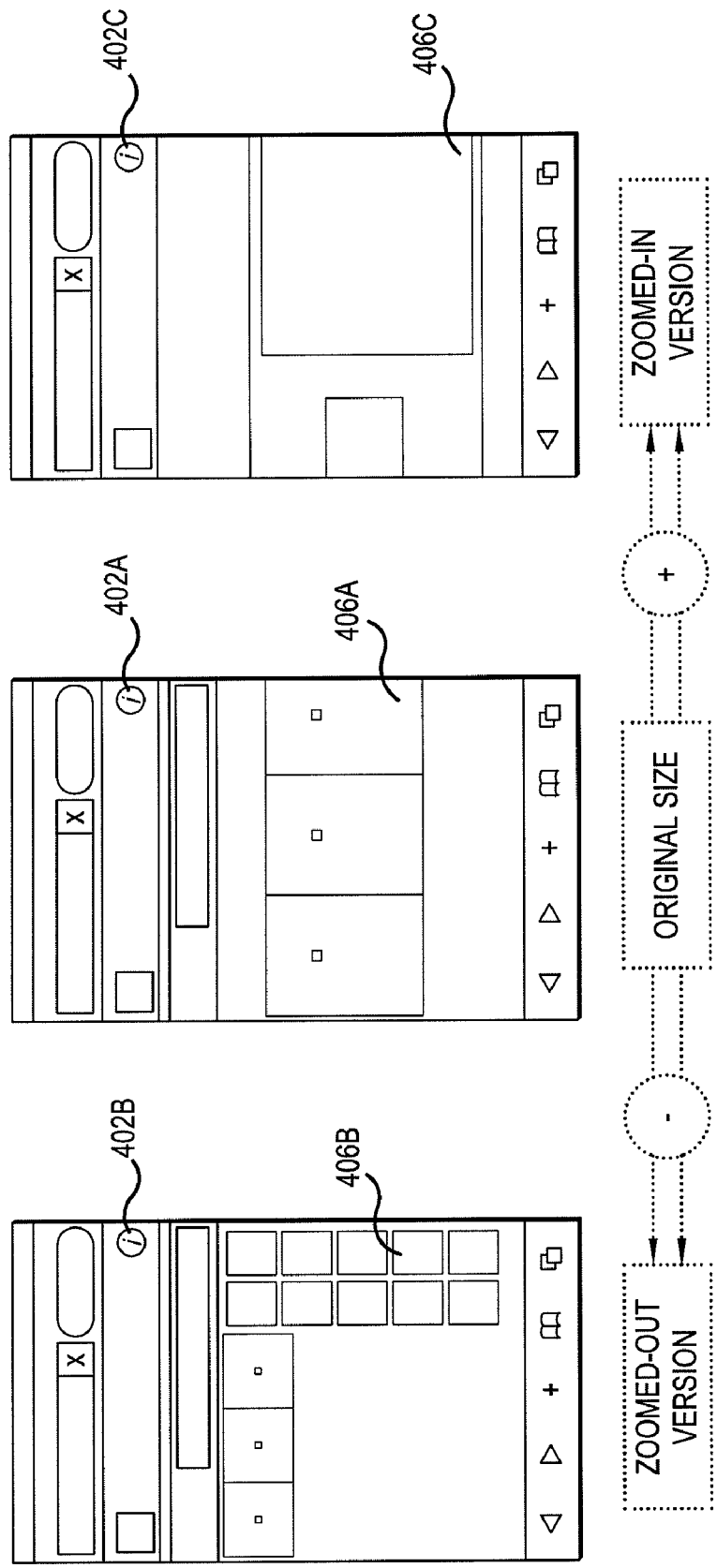
FIG. 4 provides exemplary snapshots illustrating the resizing action performed by the advertising service.

FIG. 4 provides exemplary snapshots illustrating an embodiment of fixed-scale content insert management where the resizing action is performed by an advertising service. In this example, when the webpage 406A is originally rendered within a web browser of the mobile device 104, the advertising section 402A is displayed in the form of a banner to the website 406A. During a zoom-out action, the webpage 406B is reduced in size. However, the advertising service resizes (i.e., increases the dimensions of) the advertising section 402B, such that the size of the advertising section 402B after the zoom-out action remains the same relative to the screen of the mobile device 104. Similarly, during a zoom-in action, the webpage 406C is magnified. However, the advertising service resizes (i.e., reduces the dimensions of) the advertising section 402C, such that the size of the advertising section 402C after the zoom-in action remains the same (relative to the screen of the mobile device 104).

Figure 5A:
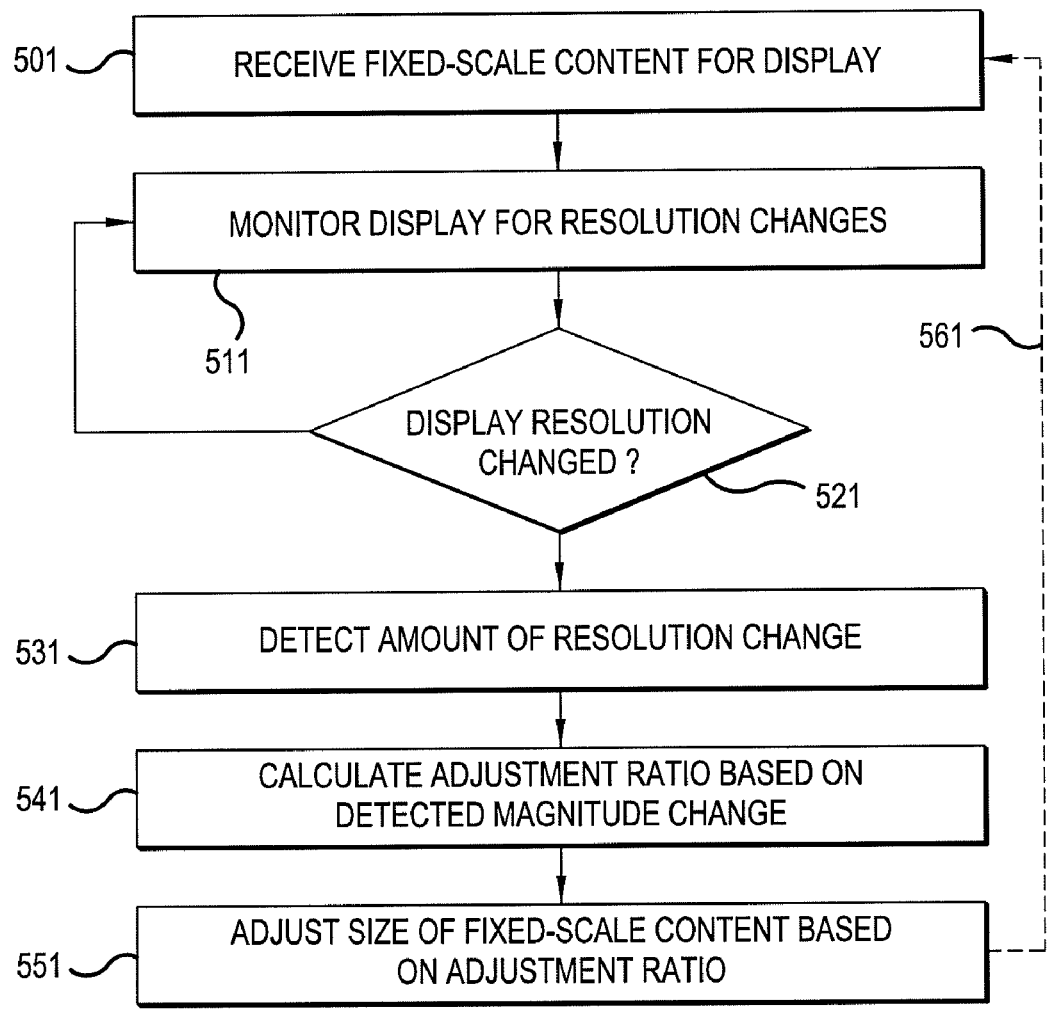
FIGS. 5a-5b are flow diagrams illustrating examples of processes by which fixed-scale advertising content is displayed on mobile devices.

FIG. 5*a* is a flow diagram illustrating an embodiment of a fixed-scale content re-sizing process. Such a process may begin with the delivery of fixed-scale (and, in some cases, fixed-position) content for display and/or presentation 501 on a device screen. In advertising embodiments, the fixed-scale content may be an advertisement delivered and/or otherwise served or managed by an advertising service operating locally on a mobile device 102, 104 in connection with a website. After the fixed-scale content is delivered and displayed on a mobile device, the device display may be monitored by, for instance, an interface module 2130 or an associated event listener, for resolution changes 511. In a variation involving an advertising service, for example, an event listener may be included with the fixed-scale content to monitor local device screen resolution changes 511 and communicate those changes to the advertising service via the mobile device web browser.

Upon detecting a change in display resolution 521, the amount of the resolution change (including an indicator of whether it is an increase or decrease) is determined 531 and an adjustment ratio is calculated 541 for the fixed-scale content. In some variations, a location adjustment may also be calculated based on a determined vertical and/or horizontal shift that may be inferred from the detected resolution change 531. In some variations, the adjustment ratio may be calculated by comparing an initial natural resolution vs. available device resolution ratio against the zoomed resolution vs. available device resolution ratio. Such an adjustment ratio determines how much the size of the fixed-scale content would vary were it allowed to zoom and therefore enables a re-sizing operation 551 to either shrink or magnify the relative size of the fixed-scale content as compared to the rest of the content displayed on the device such that it maintains the same size (and, in some cases, position) relative to the device screen . . . .

In some variations, the event detection aspect that notices a resolution change locally on the mobile device may also be configured with size, location, and/or resolution management logic that corrects a relative size of the fixed-scale content item locally on the device, within the context of the displayed information, without requiring a re-load or re-transmission of content. In such a variation, after the size of the fixed-scale content is adjusted 551, the process returns to an event listening mode 561 that monitors the display for further resolution changes 511.

Figure 5B:
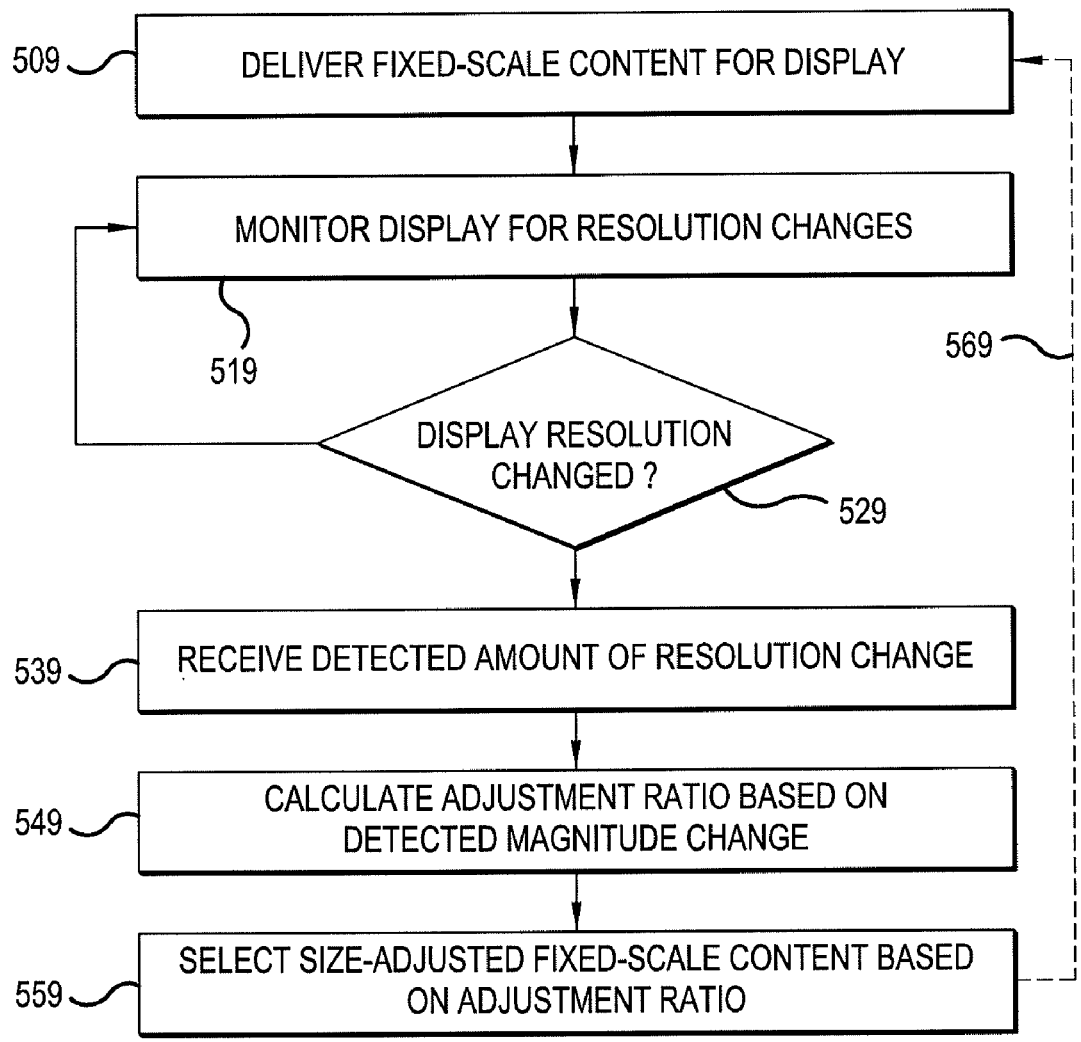

In further variations, the resolution change amount may be transmitted to an administration server and/or advertising service along with information about the available device resolution. In such variations, the size and/or location adjustment of the fixed-scale content item is performed at the server side and either a scale-adjusted content item is re-delivered to the mobile device or an updated size parameter is sent to the existing scale-adjusted content on the mobile device at the conclusion of a resolution change operation. Such a variation is depicted in FIG. 5*b*.

As is shown in the figure, after a server delivers fixed-scale content to the mobile device for display 509, a monitoring process listening for display resolution changes 519 may be initiated. Upon detection of a resolution change 529, which may be accomplished locally on the device with an event listener, the detected amount of resolution change is received by the server 539, which then calculates and adjustment ratio based on the detected change amount 549 and creates or identifies a size-adjusted content item based on that adjustment ratio 559. The size-adjusted content item is then served to the mobile device 569, where is it delivered for display 509. The size-adjusted content item is re-displayed, and the monitoring process listens for further changes in display resolution 519.

In yet further variations, the resolution change detection aspect may detect a change of resolution, calculate a local adjustment ratio, and transmit that adjustment ratio to a remote server to request a new fixed-scale content item with the appropriate resolution.

In yet further variations, the fixed-scale content item may include a certain amount of image data to enable a range of expected or otherwise pre-configured resolution changes such that the local event detection aspect may, upon detecting a change of resolution, calculate a local adjustment ratio and then determine if the local adjustment ratio can be implemented with the locally displayed fixed-scale content. If the locally displayed fixed-scale content is configured to be re-sized according to the adjustment ratio, the entire re-scaling/re-sizing operation may be carried out locally without having to access separately stored data (such as that stored on an advertising server, other remote system, and/or within non-cache memory on the device). If the locally displayed fixed-scale content cannot be re-sized according to the locally calculated adjustment ratio, then new content of an appropriate relative size/resolution may be requested to maintain the desired scale (and, in some cases, position) of the fixed-scale content.

For variations dealing with relative position adjustment, the above-discussed techniques of scale modification may include vertical and/or horizontal pixel shift calculations based on a determination of resolution change origin and/or focal point (the point on the screen from which a zoom in/out operation proceeds) in conjunction with the detected resolution change type and magnitude. Such a pixel shift detection may enable allow a local event detector or a remote content server to determine how much of a fixed-scale content item may be moved off-screen by the resolution change and the extent of that movement. Once the movement amounts are determined, they may readily be compensated for by adjusting the relative position of the fixed-scale content item to preserve its position with respect to the mobile device screen.

Figure 6:
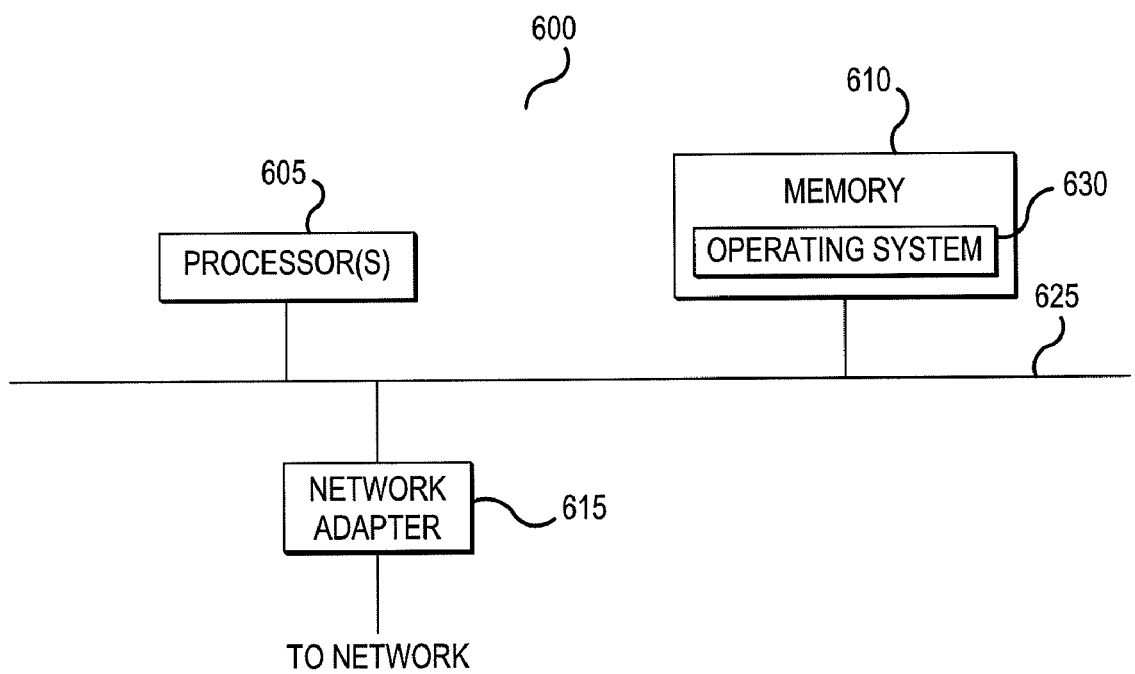
FIG. 6 is a high-level block diagram showing an example of the architecture for a computer system.

FIG. 6 is a high-level block diagram showing an example of the architecture for a computer system 600 that can be utilized to implement an administration server (e.g., 114 from FIG. 1), a web server (e.g., 120 from FIG. 1), etc. In FIG. 6, the computer system 600 includes one or more processors 605 and memory 610 connected via an interconnect 625. The interconnect 625 is an abstraction that represents any one or more separate physical buses, point to point connections, or both connected by appropriate bridges, adapters, or controllers. The interconnect 625, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 694 bus, sometimes referred to as "Firewire".

The processor(s) 605 may include central processing units (CPUs) to control the overall operation of, for example, the host computer. In certain embodiments, the processor(s) 605 accomplish this by executing software or firmware stored in memory 610. The processor(s) 605 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 610 is or includes the main memory of the computer system 1100. The memory 610 represents any form of random access memory (RAM), read-only memory (ROM), flash memory (as discussed above), or the like, or a combination of such devices. In use, the memory 610 may contain, among other things, a set of machine instructions which, when executed by processor 605, causes the processor 605 to perform operations to implement embodiments of the present invention.

Also connected to the processor(s) 605 through the interconnect 625 is a network adapter 615. The network adapter 615 provides the computer system 600 with the ability to communicate with remote devices, such as the storage clients, and/or other storage servers, and may be, for example, an Ethernet adapter or Fiber Channel adapter.

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or sub-combinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

We claim:

1. A method of maintaining the display size of a content item, included with other content displayed on a display screen of a mobile device and delivered at an initial display size, in response to a display size change event on the device that alters the displayed size of the other content, the method comprising:
    detecting the display size change event, said display size change event including a change in a displayed resolution of the other content;
    determining an intended display size of the content item responsive to the display size change event;
    determining, as an amount of display change,
    a type and magnitude of display size change based on a difference between the intended display size and the initial display size; and
    an intended location shift amount of the content item responsive to the display size change event;
    calculating an inverse adjustment ratio based on the determined type and magnitude of display size change;
    applying the inverse adjustment ratio to the size of the content item such that its displayed size remains fixed with respect to the size of the display screen of the mobile device by adjusting a resolution of the content item such that its displayed resolution changes with respect to a changed resolution of the other content but remains fixed with respect to an initial display resolution of the content item on the display screen of the mobile device;
    calculating a location recovery shift based on the location shift amount;
    applying the location recovery shift to the intended location shift amount of the content item such that the content item remains in a fixed location relative to an initial display location on the mobile device display screen; and
    enabling presentation of the adjusted content item on the mobile device along with the other content.

2. The method of claim 1, where said enabling presentation includes serving the inverse adjusted content item to the mobile device with a content server.

3. The method of claim 2, where said applying the inverse adjustment ratio includes selecting a replacement content item at the content server such that the replacement content item has or can be adjusted to have the fixed relative display size.

4. The method of claim 2, where the content item is an advertisement included as part of a web page delivered to the mobile device.

5. The method of claim 1, where said steps of calculating a location recovery shift, applying the location recovery shift, and enabling are carried out on the mobile device.

6. The method of claim 5, where a size compensator included in the content item carries out the steps of detecting, calculating an inverse adjustment ratio, and applying the inverse adjustment ratio.

7. The method of claim 5, where the content item is initially delivered to the mobile device by a content server via a communication network.

8. The method of claim 1, where the initial display size is determined by a size of the display screen.

9. The method of claim 1, where the size of the content item changes with respect to the other content.

10. A tangible, non-transitory computer-readable medium having embodied thereon a program which, when executed by a computing device, causes the device to perform a method of maintaining the display size of a content item, included with other content displayed on a display screen of a mobile device and delivered at an initial display size, in response to a display size change event on the device that alters the displayed size of the other content, the method comprising:
    detecting the display size change event, said display size change event including a change in a displayed resolution of the other content;
    determining an intended display size of the content item responsive to the display size change event;
    determining, as an amount of display change,
    a type and magnitude of display size change based on a difference between the intended display size and the initial display size; and
    an intended location shift amount of the content item responsive to the display size change event;
    calculating an inverse adjustment ratio based on the determined type and magnitude of display size change;
    applying the inverse adjustment ratio to the size of the content item such that its displayed size remains fixed with respect to the size of the display screen of the mobile device by adjusting a resolution of the content item such that its displayed resolution changes with respect to a changed resolution of the other content but remains fixed with respect to an initial display resolution of the content item on the display screen of the mobile device;
    calculating a location recovery shift based on the location shift amount;
    applying the location recovery shift to the intended location shift amount of the content item such that the content item remains in a fixed location relative to an initial display location on the mobile device display screen; and
    enabling presentation of the adjusted content item on the mobile device along with the other content.

11. The medium of claim 10, where the mobile device is the device executing the program.

12. A system for maintaining the display size of a content item, included with other content displayed on a display screen of a mobile device and delivered at an initial display size, in response to a display size change event on the device that alters the displayed size of the other content, the system comprising:
    an event listener on the device configured to detect the display size change event, said display size change event including a change in a displayed resolution of the other content;
    display change determination unit that determines an intended display size of the content item responsive to the display size change event and that determines, as an amount of display change,
    a type and magnitude of display size change based on a difference between the intended display size and the initial display size; and
    an intended location shift amount of the content item responsive to the display size change event;
    an inverse adjustment ratio calculator configured to calculate an inverse adjustment ratio based on a determined type and magnitude of display size change;

a location recovery shift calculator configured to calculate a location recovery shift based on the location shift amount;

a content adjustment unit configured to apply the inverse adjustment ratio to the size of the content item such that its displayed size remains fixed with respect to the size of the display screen of the mobile device by adjusting a resolution of the content item such that its displayed resolution changes with respect to a changed resolution of the other content but remains fixed with respect to an initial display resolution of the content item on the display screen of the mobile device; and apply the location recovery shift to the intended location shift amount of the content item such that the content item remains in a fixed location relative to an initial display location on the mobile device display screen; and a content presentation unit configured to enable presentation of the adjusted content item on the device along with the other content.

* * * * *